(12) United States Patent
Tan

(10) Patent No.: US 9,129,014 B2
(45) Date of Patent: Sep. 8, 2015

(54) PROFILE MANAGEMENT METHOD AND SYSTEM

(71) Applicant: JOOK, Inc., Carlsbad, CA (US)

(72) Inventor: Min-Liang Tan, Singapore (SG)

(73) Assignee: JOOK, INC., Carlsbad, CA (US)

( * ) Notice: Subject to any disclaimer, the term of this patent is extended or adjusted under 35 U.S.C. 154(b) by 2 days.

(21) Appl. No.: 13/887,776

(22) Filed: May 6, 2013

(65) Prior Publication Data

US 2013/0279715 A1  Oct. 24, 2013

Related U.S. Application Data

(63) Continuation of application No. 11/969,397, filed on Jan. 4, 2008, now abandoned, and a continuation-in-part of application No. 11/625,692, filed on Jan. 22, 2007, now Pat. No. 7,817,960.

(51) Int. Cl.
*G06F 17/30* (2006.01)
*H04M 1/2745* (2006.01)

(52) U.S. Cl.
CPC ..... *G06F 17/3074* (2013.01); *H04M 1/274516* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,892,037 | B2 * | 11/2014 | Auriffeille et al. | 455/41.2 |
| 2005/0210533 | A1 * | 9/2005 | Copeland et al. | 726/23 |
| 2005/0250552 | A1 * | 11/2005 | Eagle et al. | 455/567 |
| 2007/0208630 | A1 * | 9/2007 | Chatter et al. | 705/26 |
| 2008/0040452 | A1 * | 2/2008 | Rao et al. | 709/219 |
| 2008/0140525 | A1 * | 6/2008 | Lamsfuss et al. | 705/14 |
| 2009/0298514 | A1 * | 12/2009 | Ullah | 455/456.5 |

* cited by examiner

*Primary Examiner* — Hosain Alam
*Assistant Examiner* — Reza Hosseini
(74) *Attorney, Agent, or Firm* — Novak Druce Connolly Bove + Quigg LLP

(57) ABSTRACT

A system and method are disclosed for a profile management comprising receiving short profile data of a user from a device, the short profile data comprising an identifier element and being associated with long profile data of the user in a database on a network, the short profile data being indicative of at least one of data format of the short profile data and location of the database on the network; locating the database on the network based on at least one of the identifier, the data format of the short profile data and the location of the database on the network, the long profile data comprising a plurality of data elements; and retrieving at least one of the plurality of data elements of the long profile data from the database upon the database being located.

2 Claims, 3 Drawing Sheets

PROFILE MANAGEMENT METHOD AND SYSTEM

RELATED APPLICATION

This application is a continuation of U.S. application Ser. No. 11/969,397, filed Jan. 4, 2008, which in itself is a continuation-in-part of U.S. application Ser. No. 11/625,692, filed Jan. 22, 2007, and claims the benefit(s) thereof.

FIELD OF THE INVENTION

The present invention relates generally to the field of wireless communications. More specifically, the present invention relates to a system and method for wireless networking among different devices.

BACKGROUND OF THE INVENTION

Many prior art media devices can receive radio broadcasts from such sources such as FM, AM or satellite broadcasts. With respect to headphones, wireless headphones receive music from media devices via a variety of methods, such as infra-red transmission, 25 mhz radio or 2.4 ghz radio transmission technologies such as Bluetooth.

Media devices can transfer media files such as music and/or video files wirelessly between other similar media devices via similar methods as described above. The transferring of such files is usually from one storage medium to another.

Despite the advantages of the foregoing, wired headphones and/or earbuds suffer from limitations. Some such systems allow one user to share the music experience by passing one wired headphone or earbud to a third party. This shared experience, however, does not allow the third party to experience the full stereo experience of the music. Headphone adapter jacks exist for two wired headphones to be connected to the same media device but this also requires both users to be tethered close to the same media device.

Shared music by transfer of media files from one storage medium to other storage medium often infringe upon third party intellectual property rights.

Prior art wireless headphones do not allow users to share music from the same media device such as an MP3 player. Wireless headphones are also limited to the range of the wireless transmitter and users using wireless headphones cannot be too far from the source. Also, general transmission techniques such as Bluetooth are generally accessible to anyone having the capability to receive that data.

Conventional wireless communication technology connects two or more devices through a common network source. The two or more devices typically allow their users to communicate through voice, text or images. However, in a situation where it is desirable for two users of the devices to positively interact, a human facilitator is usually preferred. The human facilitator will have knowledge of individual profiles such as personal characteristics and preferences about each of the two users. The facilitator then reviews the information and identifies any matches in the personal characteristics and preferences of the two users. If such matches exit, the facilitator then informs the two users about the matches and introduces the two users to each other.

However, in the absence of the human facilitator, interaction between the two or more individual is usually hampered by one individual's lack of profile knowledge of the other individuals and the uncertainty of the other individual's willingness to interact.

Even in with the presence of the human facilitator, interaction is only limited to individuals who are within visual proximity from one another. Additionally, being provided with another person's contact number still does not facilitate the interaction as there is always an uncertainty as to the interaction preference of the other individual or the suitability of the other individual's profile to meet one individual's preference.

There is therefore a need for a system and a method for facilitating interaction between individuals in the absence of a human facilitator and visual proximity.

SUMMARY OF THE INVENTION

In accordance with a first aspect of the disclosure, there is disclosed a profile management method comprising receiving short profile data of a user from a device, the short profile data comprising an identifier element and being associated with long profile data of the user in a database on a network, the short profile data being indicative of at least one of data format of the short profile data and location of the database on the network; locating the database on the network based on at least one of the identifier, the data format of the short profile data and the location of the database on the network, the long profile data comprising a plurality of data elements; and retrieving at least one of the plurality of data elements of the long profile data from the database upon the database being located.

In accordance with a second aspect of the disclosure, there is disclosed a device-readable medium having stored therein a plurality of programming instructions, which when executed on a device, the instructions cause the device to receive short profile data of a user from a device, the short profile data comprising an identifier element and being associated with long profile data of the user in a database on a network, the short profile data being indicative of at least one of data format of the short profile data and location of the database on the network; locate the database on the network based on at least one of the identifier, the data format of the short profile data and the location of the database on the network, the long profile data comprising a plurality of data elements; and retrieve at least one of the plurality of data elements of the long profile data from the database upon the database being located.

In accordance with a third aspect of the disclosure, there is disclosed a profile management system comprising means for receiving short profile data of a user from a device, the short profile data comprising an identifier element and being associated with long profile data of the user in a database on a network, the short profile data being indicative of at least one of data format of the short profile data and location of the database on the network; means for locating the database on the network based on at least one of the identifier, the data format of the short profile data and the location of the database on the network, the long profile data comprising a plurality of data elements; and means for retrieving at least one of the plurality of data elements of the long profile data from the database upon the database being located.

In an embodiment, there is provided a system for sharing an audible experience comprising: a first headphones comprising: a plurality of speakers; a wireless transceiver; and a first control system for said wireless transceiver adapted to control a transmission of a first encoded audio signal to a second headphones comprising a second wireless transceiver and a second control system adapted to generate an audio playback corresponding to said first audio signal; whereby said first headphones and said second headphones are part of a closed network.

In an embodiment, said second headphones comprise a user interface to receive input from a user.

In an embodiment, said user interface includes a setting to opt to play said first audio signal received from said first headphones.

In an embodiment, said user interface includes a setting to opt to retransmit said first audio signal.

In an embodiment, said retransmission of said audio signal is on a designated channel selected using the user interface.

In an embodiment, said second control system is adapted to transmit a second audio signal to a third headphones simultaneously with its receiving said first audio signal.

In an embodiment, said second control system generates said audio playback to said first audio signal while transmitting said second audio signal to said third headphones.

In an embodiment, said transmission occurs on one of a plurality of disc channels.

In an embodiment, said one of a plurality of discrete channels is selected automatically.

In an embodiment, said automatic selection occurs by hunting.

In an embodiment, said automatic selection occurs by frequency hopping.

In an embodiment, said one of a plurality of discrete channels is selected manually.

In an embodiment, said manual selection is denoted by numbers.

In an embodiment, said manual selection is denoted by colors.

In an embodiment, said one of a plurality of discrete channels is indicated by a visual cue.

In an embodiment, said one of a plurality of discrete channels is indicated by an audible cue.

In an embodiment, there is provided an audio sharing network comprising: a first playback system comprising; a first wireless transceiver; and a first control system for said wireless transceiver adapted to control reception, transmission and playback of a dedicated audio signal; and a second playback system comprising: a second wireless transceiver; and a second control system adapted for said wireless transceiver adapted to control reception, transmission and playback of said dedicated audio signal.

In an embodiment, said second control system is adapted to allow a user to rebroadcast said dedicated audio signal to a third playback system.

In an embodiment, said second control system is adapted to decode said dedicated audio signal.

In an embodiment, said first control system is adapted to encrypt said dedicated audio signal before transmission, thereby generating an encrypted audio signal.

In an embodiment, there is provided a profile management method comprising: receiving short profile data of a user from a device, the short profile data comprising an identifier element and being associated with long profile data of the user in a database on a network, the short profile data being indicative of at least one of data format of the short profile data and location of the database on the network; locating the database on the network based on at least one of the identifier, the data format of the short profile data and the location of the database on the network, the long profile data comprising a plurality of data elements; and retrieving at least one of the plurality of data elements of the long profile data from the database upon the database being located.

In an embodiment, the short profile data further comprising at least one of contact details, preferences and bio-data of the user.

In an embodiment, the method further comprising: updating the database with the at least one of contact details, preferences and bio-data of the user.

In an embodiment, the method further comprising: processing the short profile data to identify the user as one of an acceptable user and an unacceptable; and discarding the short profile data of the user upon identifying the user as an unacceptable user.

In an embodiment, receiving short profile data of a user from a device comprising: receiving the short profile data and metadata of the short profile data from the device.

In an embodiment, the metadata comprising at least one of an encryption key and information on encryption format of the long profile data.

In an embodiment, the metadata being descriptive of at least one of the data format of the short profile data and data format of the long profile data.

In an embodiment, retrieving at least one of the plurality of data elements of the long profile data from the database comprising: providing a plurality of required data fields; providing a plurality of source data fields, each of the plurality of data elements of the long profile being associated with one of the plurality of source data fields; and retrieving the at least one of the plurality of data elements with at least one of the plurality of source data fields corresponding with at least one of the plurality of required data fields.

In an embodiment, locating the database on the network based on at least one of the identifier, the data format of the short profile data and the location of the database on the network comprising: searching at least one of a plurality of nodes of the network based on at least one of the identifier and the data format of the short profile data for retrieval of at least one of the plurality of data elements of the long profile data therefrom.

In an embodiment, locating the database on the network based on at least one of the identifier, the data format of the short profile data and the location of the database on the network comprising: locating at least one base station forming a node on the network, the at least one base station being in data communication with a device hosting the database, wherein the plurality of data elements of the long profile data is retrievable from the database via the at least one base station.

In an embodiment, there is provided a device-readable medium having stored therein a plurality of programming instructions, which when executed on a device, the instructions cause the device to: receive short profile data of a user from a device, the short profile data comprising an identifier element and being associated with long profile data of the user in a database on a network, the short profile data being indicative of at least one of data format of the short profile data and location of the database on the network; locate the database on the network based on at least one of the identifier, the data format of the short profile data and the location of the database on the network, the long profile data comprising a plurality of data elements; and retrieve at least one of the plurality of data elements of the long profile data from the database upon the database being located.

In an embodiment, the short profile data further comprising at least one of contact details, preferences and bio-data of the user.

In an embodiment, the plurality of programming instructions, which when executed, cause the device further to:

update the database with the at least one of contact details, preferences and bio-data of the user.

In an embodiment, the plurality of programming instructions, which when executed, cause the device further to: process the short profile data to identify the user as one of an acceptable user and an unacceptable; and discard the short profile data of the user upon identifying the user as an unacceptable user.

In an embodiment, the plurality of programming instructions, which when executed, cause the device further to: receive the short profile data and metadata of the short profile data from the device.

In an embodiment, the metadata comprising at least one of an encryption key and information on encryption format of the long profile data.

In an embodiment, the metadata being descriptive of at least one of the data format of the short profile data and data format of the long profile data.

In an embodiment, the plurality of programming instructions, which when executed, cause the device further to: provide a plurality of required data fields; provide a plurality of source data fields, each of the plurality of data elements of the long profile being associated with one of the plurality of source data fields; and retrieve the at least one of the plurality of data elements with at least one of the plurality of source data fields corresponding with at least one of the plurality of required data fields.

In an embodiment, the plurality of programming instructions, which when executed, cause the device further to: search at least one of a plurality of nodes of the network based on at least one of the identifier and the data format of the short profile data for retrieval of at least one of the plurality of data elements of the long profile data therefrom.

In an embodiment, the plurality of programming instructions, which when executed, cause the device further to: locate at least one base station forming a node on the network, the at least one base station being in data communication with a device hosting the database, wherein the plurality of data elements of the long profile data is retrievable from the database via the at least one base station.

In an embodiment, there is provided a profile management system comprising:

Means for receiving short profile data of a user from a device, the short profile data comprising an identifier element and being associated with long profile data of the user in a database on a network, the short profile data being indicative of at least one of data format of the short profile data and location of the database on the network; means for locating the database on the network based on at least one of the identifier, the data format of the short profile data and the location of the database on the network, the long profile data comprising a plurality of data elements; and means for retrieving at least one of the plurality of data elements of the long profile data from the database upon the database being located.

In an embodiment, the short profile data further comprising at least one of contact details, preferences and bio-data of the user.

In an embodiment, the system further comprising: means for updating the database with the at least one of contact details, preferences and bio-data of the user.

In an embodiment, the system further comprising: means for processing the short profile data to identify the user as one of an acceptable user and an unacceptable; and means for discarding the short profile data of the user upon identifying the user as an unacceptable user.

In an embodiment, the means for receiving short profile data of a user from a device comprising: means for receiving the short profile data and metadata of the short profile data from the device.

In an embodiment, the metadata comprising at least one of an encryption key and information on encryption format of the long profile data.

In an embodiment, the metadata being descriptive of at least one of the data format of the short profile data and data format of the long profile data.

In an embodiment, the means for retrieving at least one of the plurality of data elements of the long profile data from the database comprising: means for providing a plurality of required data fields; means for providing a plurality of source data fields, each of the plurality of data elements of the long profile being associated with one of the plurality of source data fields; and means for retrieving the at least one of the plurality of data elements with at least one of the plurality of source data fields corresponding with at least one of the plurality of required data fields.

In an embodiment, the means for locating the database on the network based on at least one of the identifier, the data format of the short profile data and the location of the database on the network comprising: means for searching at least one of a plurality of nodes of the network based on at least one of the identifier and the data format of the short profile data for retrieval of at least one of the plurality of data elements of the long profile data therefrom.

In an embodiment, the means for locating the database on the network based on at least one of the identifier, the data format of the short profile data and the location of the database on the network comprising: means for locating at least one base station forming a node on the network, the at least one base station being in data communication with a device hosting the database, wherein the plurality of data elements of the long profile data is retrievable from the database via the at least one base station.

BRIEF DESCRIPTION OF THE DRAWINGS

The foregoing and other advantages of the invention will become apparent upon reading the following detailed description and upon reference to the drawings, wherein.

Figure 1:
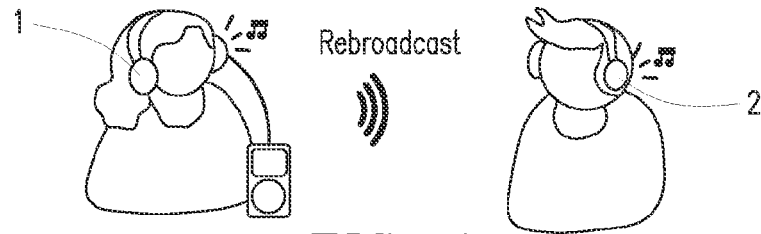
FIG. 1 illustrates a schematic view of a person sharing audio in accordance with one aspect of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF PREFERRED EMBODIMENTS

As set forth above, embodiments of the invention provide a system and method for wirelessly sharing an audio experience among a plurality of users. The system contemplates a plurality of devices, any one of which is able to transmit to one or more other device. This allows one or more user of a device to receive the appropriate audio sounds from the transmitting device, thereby creating an audio sound sharing network. Alternatively, the users of any of the receiving devices can also opt to set their device to transmit while aforementioned users of the transmitting devices can also opt to set their devices receive.

Dedicated and Broadcast Use

Figure 2:
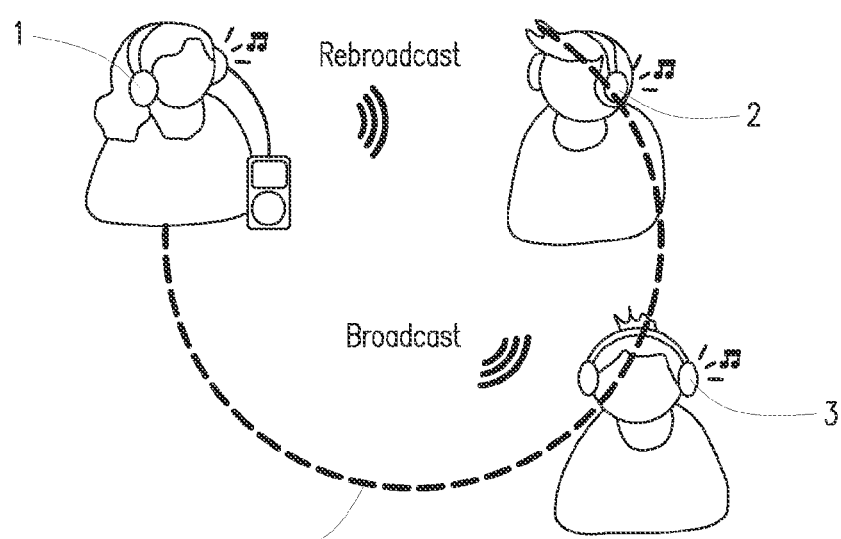
FIG. 2 illustrates a schematic view of a plurality of persons sharing audio from a single source in accordance with one aspect of the present invention.

As shown in FIG. 1, the user of a device 1 can opt to only transmit a dedicated signal from 1 to another device 2; in this instance, device 2 will be the only receiving device for 1. Device 2 decodes the signal from device 1 to provide the user of device 2 with the appropriate/desired audio sounds. As used herein, the term "dedicated" is used to refer to a closed network, whereby only users of that network may have ready access to the decoding and/or decrypting technology to access the communicated signals. A "closed network" can refer to a network that employs proprietary technology that is not directly interoperable with other standards-based networks, or that adds an additional layer of encoding onto standards-based networks. A "closed network" also encompasses a private network that can only be used by authenticated or authorized devices; e.g., outsider use may be prohibited and enforced through cryptographic means. A closed network is thus distinct from an open network such as Bluetooth, whereby any device that is Bluetooth-enabled may (in the absence of proprietary encoding or encryption) receive and process that signal. Referring now to FIG. 2, a user of device 1 can opt to set device 1 to broadcast. As such, enabled third parties in the range of transmission of 1, such as the user of a device 3 and potentially others, can opt to set their respective devices to receive from device 1, or on a channel on which device 1 is set to transmit. Device 3 and others can now decode the signal from device 1 to provide the user of device 3 and others with the appropriate/desired audio sounds.

Figure 3:
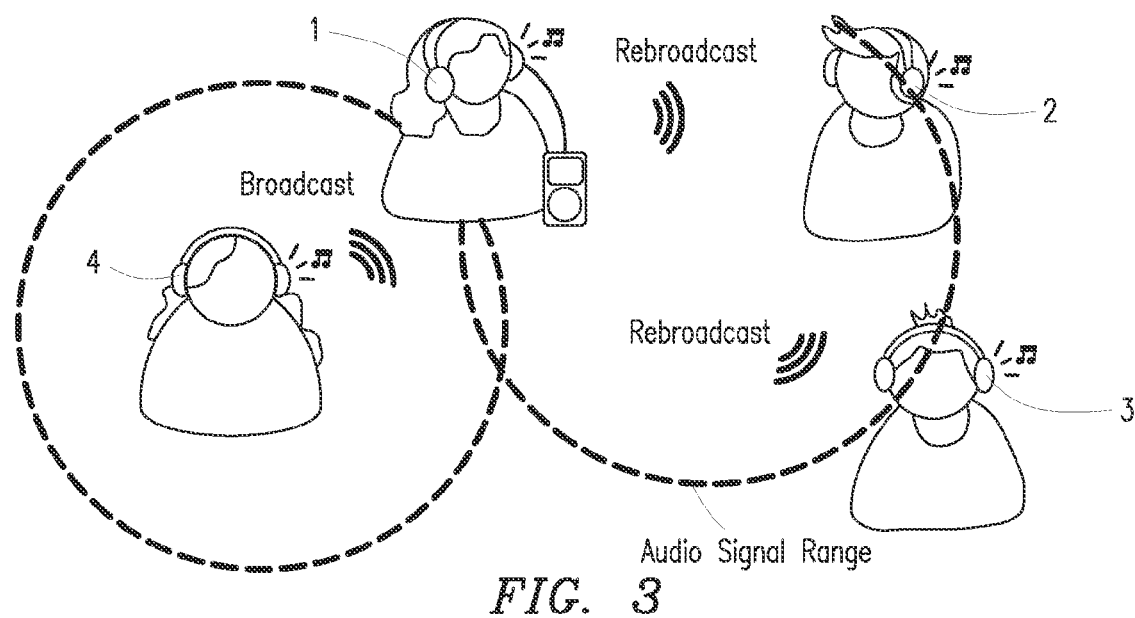
FIGS. 3 and 4 illustrate other embodiments of the invention in which a plurality of rebroadcasts occur.

As shown in FIG. 3, the user of device 1 can also opt to set device 1 to receive from other transmitting devices (e.g., device 4) belonging to other users.

Rebroadcasting

Figure 4:
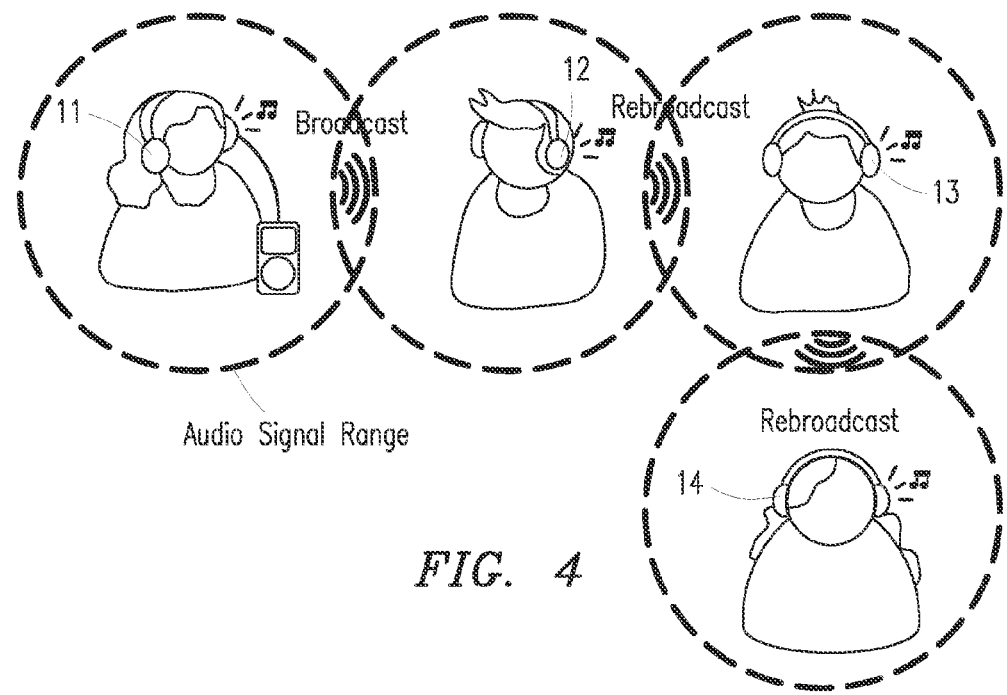

The system and method of the present invention can also be used in the context of re-broadcasting. For example, as shown in FIG. 4, with the user can set device 11 on broadcast, the user of device 12 which is receiving the audio sounds can opt to set device 12 to receive the audio sounds from device 11 and to simultaneously re-broadcast the same audio sounds to other users' devices (e.g., 13, 14, etc.). Rebroadcasting may be undertaken before or after decoding the signal; if the latter, the signal will be encoded prior to being retransmitted. The encoding may be the same as, or in some applications different from, the original encoding.

Rebroadcast thus allows user of device 13 who is out of the range of device 11 but in the range of the re-broadcast of device 12 to receive the appropriate audio signals from device 11, via device 12.

Likewise, if the user of device 13 opts to set device 13 to re-broadcast, the user of device 14, who is out of the range of the broadcast of device 11 and the re-broadcast of device 12, can opt to set device 14 to receive the appropriate audio sounds from device 14 via devices 12 and 13.

For all the applications above, the users of devices 12, 13 and 14 can also set their respective devices to receive the appropriate audio signals which are being re-broadcasted.

Figure 5:
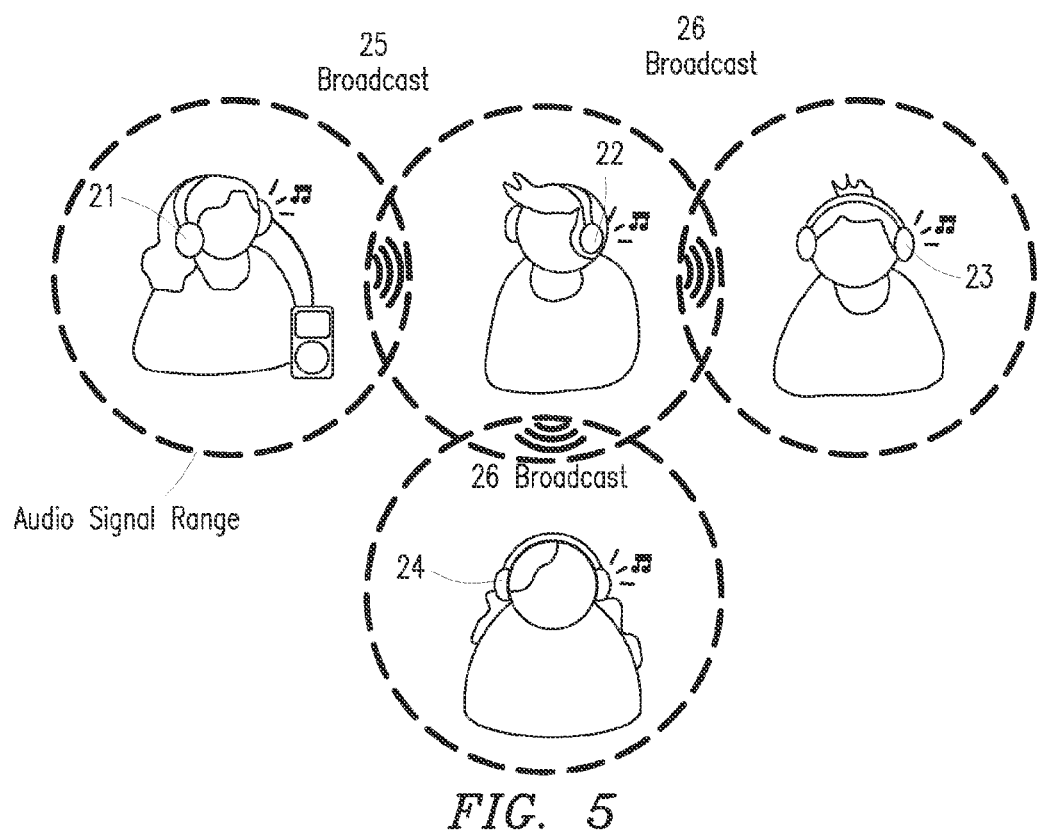
FIG. 5 illustrates another embodiment of the invention in which a plurality of broadcasts occur, and in which differing audio signals may be communicated among the various devices.

FIG. 5 depicts an alternative embodiment of the invention that enables use with the simultaneous reception and transmission/broadcast of different audio sounds. As shown in FIG. 5, the user of device 21 sets device 21 to transmit or broadcast a certain audio signal 25.

The user of device 22 can set his device to receive the transmission/broadcast of AS1 from device 21. The user of device 22 can simultaneously opt to set device 22 to transmit or broadcast a different audio sound 26 on a different channel which can be received by users of devices 23, 24, etc, provided that they have set their respective devices to receive the transmission or broadcast of 26 on that channel from the user of device 22.

This invention also enables use in multi-channel transmission or broadcast (simultaneous or otherwise). With multiple users transmitting in a limited range, the implementation of the wireless transmission may be made in dedicated channels which users may opt to receive either:

i. automatically via hunting and/or frequency hopping; or ii. manually by tuning to specific frequencies denoted by:

a. discrete channels denoted by numbers (e.g., Channel 1, Channel 2, etc);

b. discrete channels denoted with colors (e.g., Red, Green, Blue); or c. other methods consistent with those known to persons of skill in the art.

In order to identify the mode in which a device is operating (either transmitting, broadcasting, re-broadcasting or receiving), the user of a device can opt to set either cues on his device or cues to be displayed/received on third parties' device to allow third parties to identify the mode in which a device is operating. The cues could take various forms or combination of forms such as:

a. visual cues, including text, colored indicators or lights, which will indicate the various modes in which the device is operating; and b. sound cues which will indicate the various modes in which the device is operating. Such sounds can either be heard audibly or through use of the device).

(e.g., Device 21 is set to broadcast. Device 21 flashes a blue light which users of other Devices (22, 23, etc.) can see and then opt to set devices 22, 23, etc. to receive device 21's broadcast.)

According to another aspect of the present disclosure, there is provided a system and a method for facilitating interaction between individuals in the absence of a human facilitator and visual proximity. The system comprises a unit, such as a dongle, that is adapted for connection to an audio device, a telecommunication device, a personal digital assistant (PDA) or a similar device. The device is preferably standalone and includes an interface for receiving the unit. Alternatively, the unit is integrated with the device having at least one of audio playback, telecommunication or personal digital assistant (FDA) functionalities.

Figure 6:
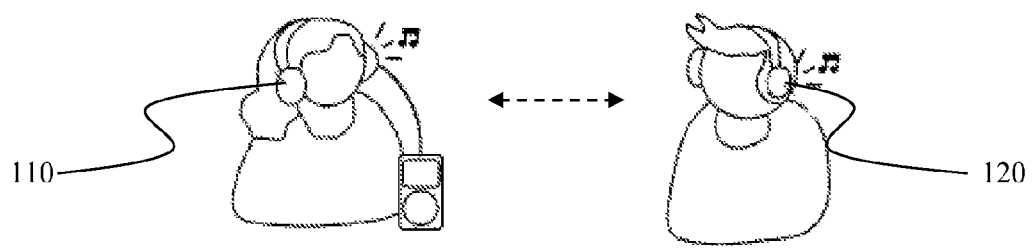
FIG. 6 shows two users exchanging individual profiles wirelessly through their respective devices.

FIG. 6 shows two users exchanging individual profiles wirelessly through their respective devices. In FIG. 6, a first unit and a second unit are integrated with a first device 110 and a second device 120 respectively, according to a preferred embodiment of the invention. The first and second devices 110, 120 are originally communicatively incompatible. The integration of the unit with each of the first and second devices 110, 120 allows wireless communication to be established between the two devices 110, 120.

The user of the first device 110 initiates exchange of information with the user of the second device 120 via initiation signaling. This involves transmission of exchange signals from the first device 110 to the second device 120 and the reception of the exchange signals by the second device 120 or vice versa. The exchange signals carry exchange data that comprises an exchange property, which is identifiable as one of an approved or unapproved property. The exchange signals may or may not contain full information.

In a first situation, the user of the first device 110 requests information from the user of the second device 120. In particular, the first device 110 contains a first profile data that is transmitted to the second device 120 as first profile signals for requesting information from the second device 120. The first profile data corresponds to a first data field that comprises a first plurality of data elements. The second device 120 contains a second profile data that corresponds to a second data field. The second profile data comprises a second plurality of data elements.

The exchange signals contain at least some basic identification, such as an identifier for initiating the exchange. The identifier may or may not contain preference information for exchange approval. Examples of the exchange property include an identifier of the first or second devices 110, 120, a characteristic of the second profile data or one of the second plurality of data elements. The characteristic of the second profile data includes data format of the second profile data, size of the second profile data or quantity of the second plurality of data elements.

In particular, the first plurality of data elements relates to information associated with the first user and the second plurality of data elements relates to information associated with the second user.

Upon receiving the exchange signal by the second device 120, there may or may not be additional verification steps to be conducted by the second device 120. The second device 120 then transmits profile availability signals to the first device 110. The profile availability signals preferably carry at least an availability indicator recognizable by the first device 110, the characteristic of the first profile data or one of the first plurality of data elements.

The second device 120 has a plurality of allowable properties. The exchange property from first device 110 is then compared with the plurality of allowable properties. The exchange property is subsequently identified as the approved property if the exchange property matches with one of the plurality of allowable properties.

In response to the exchange property being an approve property, the second profile data of the second device 120 is transmitted to the first device 110 as a third profile signal. Alternatively, the exchange of information will be approved for all except user of a certain preference. The preference is reflected as the first profile data in the first device 110.

Exchange of information could be preceded by the second device 120 encrypting the second profile data. The second device 120 then converts the encrypted second profile data into the second profile signals prior to transmission to the first device 110. The first device 110 then receives the encrypted second profile signals as encrypted first profile data. The encrypted first profile data is subsequently decrypted.

Request for profile could also include a requisite format to make sure that key data fields are included and that redundant data fields are excluded. Alternatively, the data elements are filtered subsequent to being received on the respective devices.

In another situation, exchange of information involves the user of the second device 120 initiating a request for information from the user of the first device 110. Similar to the foregoing description, the second profile with the first plurality of data elements is transmitted from the second device 120 to the first device 110 in response to the exchange property being an approved property.

In situation where the received information by the first device 110 from the second device 120 is a short profile data that is incomplete based on a pre-determined set of identifier element such as data fields, the information must contain the necessary information or clues (e.g. identifier, pseudo names, data format, address). This is to enable retrieval of information by the first device 110 from a dedicated database containing long profile data on a network or from multiple nodes (representing devices or websites like flickr or facebook) where the necessary information is obtainable.

The short profile data is indicative of at least data format of the short profile data or location of the dedicated database on the network. Examples of the short profile data include contact details, preferences and bio-data of the user of the second device 120.

Additionally, the short profile data has metadata that comprises at least an encryption key or information on encryption format of the long profile data. In particular, the metadata being descriptive of at least the data format of the short profile data or data format of the long profile data.

The short profile data is preferably processed to identify the user of the second device 120 as one of an acceptable user and an unacceptable. The short profile data of the user of the second device 120 is discarded if the user upon identifying the user of the second device 120 is identified as an unacceptable user.

The long profile data from the dedicated database is provided with a plurality of required data fields. More specifically, each of the plurality of data elements of the long profile data being associated with one of the plurality of source data fields. The first device 110 subsequently retrieves at least one of the plurality of data elements with at least one of the plurality of source data fields corresponding with at least one of the plurality of required data fields.

The information is located based on at least one of the identifier, the data format of the short profile data and the location of the dedicated database on the network or the long profile data that comprises a plurality of data elements. More specifically, the location of the information involves a search for at least one of a plurality of nodes of the network based on at least one of the identifier and the data format of the short profile data for retrieval of at least one of the plurality of data elements of the long profile data therefrom.

The first device 110 subsequently retrieves the plurality of data elements upon the dedicated database being located on the network. The second profile data of the first user 110 is then updated with at least one of the contact details, preferences and bio-data of the user of the second device 120.

More specifically, the retrieval of information may be done via a personal computer or dedicated base station that points to or is in communication with the first device 110. The personal computer or base station is in data communication with the first device 110 hosting. Based on the pre-determined set of data fields, the empty data fields are populated (or most of them) with information retrieved from the dedicated database on the network. There will be instances where not all the data fields can be completely populated.

Additionally, should certain data fields on the dedicated database be empty but correlates to the data field of the data element contained in the second device 120, for example the pseudo names and contact number correlating to an identifier which are received during the initial handshake or data exchange, the device may reverse update the fields on the dedicated database on the network. This is on condition that the data fields are flagged as updateable on the network.

Figure 7:
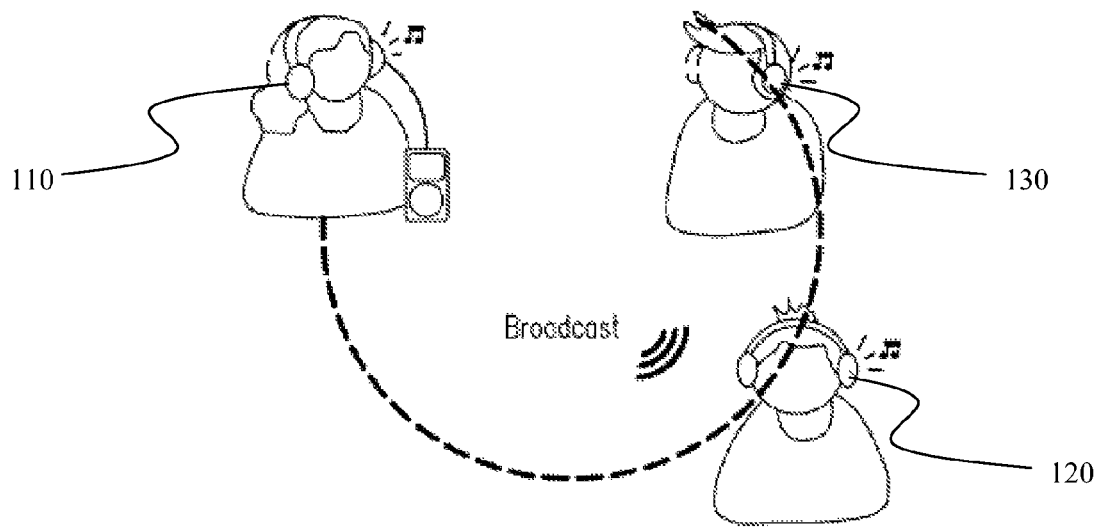
FIG. 7 shows three users exchanging individual profiles wirelessly through their respective devices, the first two users exchanging their individual profiles via the third user.

As shown in FIG. 7, the handshake, verification, data exchange and update of the first and second devices 110, 120 may be done on the go and via one or more third device 130 between the communicating first and second devices 110, 120.

The foregoing discussion focuses principally on the sharing of music and other audio. It is understood, however, that other applications will also be useful. For example, the application could be used in a gaming environment, in which it is desired that a number of players share a similar audio experience. For example, all such members may be sharing a communications "channel" in the virtual environment, In addition, the present invention could be advantageously applied in the areas of education and training.

As noted above, while the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A profile management method of a user of an audio device comprising a first wireless transceiver and a first control system for controlling the first wireless transceiver, the first control system adapted to selectively control a plurality of control operations, the control operations including: (i) transmission of a first signal, (ii) reception of a second signal, and (iii) reception and simultaneous retransmission of the second signal; the method comprising:
   receiving short profile data of a user from a device, the short profile data comprising an identifier element and being associated with long profile data of the user in a database on a network, the short profile data being indicative of at least one of data format of the short profile data and location of the database on the network, wherein the short profile data is incomplete profile data;
   searching for at least one of a plurality of nodes of the network based on at least one of the identifier and the data format of the short profile data;
   locating the database on the network based on at least one of the identifier, the data format of the short profile data and the location of the database on the network, the long profile data comprising a plurality of data elements;
   retrieving at least one of the plurality of data elements of the long profile data from the database upon the database being located;
   populating empty data fields of the short profile with the retrieved at least one of the plurality of data elements; and
   wherein the short profile data further comprises at least one of an encryption key or information on encryption format of the long profile data.

2. A profile management device of a user of an audio device comprising a first wireless transceiver and a first control system for controlling the first wireless transceiver, the first control system adapted to selectively control a plurality of control operations, the control operations including: (i) transmission of a first signal, (ii) reception of a second signal, and (iii) reception and simultaneous retransmission of the second signal;
   wherein the profile management device comprises a processor is configured to receive short profile data of a user from a device, the short profile data comprising an identifier element and being associated with long profile data of the user in a database on a network, the short profile data being indicative of at least one of data format of the short profile data and location of the database on the network, wherein the short profile data is incomplete profile data;
   wherein the processor is further configured to search for at least one of a plurality of nodes of the network based on at least one of the identifier and the data format of the short profile data;
   wherein the processor is further configured to locate the database on the network based on at least one of the identifier, the data format of the short profile data and the location of the database on the network, the long profile data comprising a plurality of data elements;
   wherein the processor is further configured to retrieve at least one of the plurality of data elements of the long profile data from the database upon the database being located;
   wherein the processor is further configured to populate empty data fields of the short profile with the retrieved at least one of the plurality of data elements; and
   wherein the short profile data further comprises at least one of an encryption key or information on encryption format of the long profile data.

* * * * *